March 15, 1949.   C. G. MUENCH   2,464,523
MIXER
Filed Oct. 4, 1944

Inventor:
Carl G. Muench
By: Edw. A. Hampson
Attorney

Patented Mar. 15, 1949

2,464,523

UNITED STATES PATENT OFFICE 2,464,523

MIXER

Carl G. Muench, Glenview, Ill., assignor to The Celotex Corporation, Chicago, Ill., a corporation of Delaware Application October 4, 1944, Serial No. 557,132

2 Claims. (Cl. 259—10)

In the past, so far as is known, in the mixing of calcined gypsum in particular, but also in connection with mixing other more or less like materials, many various types of mixers have been used, including even some mixers designed especially for the mixing of this kind of material. Invariably, or at least so far as it is known, in none of these previous mixers for mixing such materials has there been any real control over the various ingredients mixed.

Herein, in connection with a description of the preferred form of the mixer, such will be specifically described as a mixer for the mixing of calcined gypsum, which is quite generally referred to as "stucco."

In mixing calcined gypsum, particularly for use in the manufacture of wall boards or the like, it is to be understood that such is not merely a simple mixing of a certain amount of water with a calcined gypsum to form a gypsum slurry for deposit between the cover sheets which comprise the facings of a gypsum wall board. For competitive manufacture of gypsum wall board, it is essential that the calcined gypsum, of which the core is formed, be especially mixed so as to obtain a finished wall board in which the core is of relatively light weight, that is, it is not a solid gysum core but is a core composed principally of set gypsum, but which has been so prepared and mixed, and to which there has been added requisite other materials, so that the finished gypsum core is of a porous or more or less cellular structure in order that the weight of the final product may be kept relatively low, in accordance with competitive practices in the industry involved.

In the past, in particular, the amount of air which may be beaten into or incorporated in a gypsum slurry in the process of its mixing has been entirely unregulated, and has depended, substantially, entirely upon the uncontrolled conditions incident to the mixing of the slurry. Normally, it is the practice, for the preparation of a gypsum slurry, to introduce the required calcined gypsum into a mixer together with water and other ingredients which may be included, and which various materials are then mixed in direct association with the surrounding air. In the course of the mixing of the ingredients to result in the desired gypsum slurry, the beating or mixing action which takes place incorporates some air into the mixture and, in particular, according to current commercial practice, the materials which are fed to the mixer to be mixed are such that air is definitely incorporated into the resulting gypsum slurry. While there are various practices followed in preparing gypsum slurry for the manufacture of gypsum wall board, it is common to incorporate in the mix an amount of paper fiber, or the like, which acts more or less as an entangling agent for small air bubbles or globules of air to retain them in the mix, and to incorporate in the mix a so-called surface active agent which has the property of reducing the surface tension in the mix to promote the formation of air cells therein, and in connection with the use of which it is common to incorporate in the mix a further glutinous or the like material to promote the formation of stable air cells or globules of air within the mix.

In connection with the disclosure of the mixer hereof, and for the purposes of disclosing the preferred form of invention, there has been illustrated and will be described a form of mixer in which all the various ingredients fed thereto are continuously proportioned, including the air which is supplied, so that a uniform mix may be obtained, and the mixing is one wherein use is made of a surface tension reducing agent for promoting or aiding in the formation of or incorporation of air cells or globules within the slurry which is mixed in and issues from the mixer.

The mixer specifically disclosed is what is termed a "continuous mixer," that is one in which the ingredients are continuously fed in, in measured quantities in proper proportion, one to the other, and in which mixer the various ingredients are continuously mixed to continuously issue from the mixer as a gypsum or stucco slurry for introduction between the cover sheets for a wall board to comprise the core thereof.

It is, in particular, the object of this invention to disclose a continuous mixer which in particular is adapted for mixing the ingredients for the formation of a gypsum slurry for introduction between cover sheets passing into a gypsum board-forming machine.

It is a further object of this invention to provide such a mixer, which is a continuous mixer—that is one wherein the ingredients which make up the slurry are fed thereto continuously in a definite proportioned ratio so that the resulting slurry under any given conditions is uniform.

It is a still further object of the invention hereof to disclose such a mixer as a closed mixer, wherein there is a steady flow of the materials and gypsum slurry into, through and from the mixer, so that the materials being mixed are kept in motion and prevented from setting internally on various parts of the interior of the mixer.

Finally, it is an object of this invention to provide a mixer, as above, wherein the internal surfaces are continuously swept by moving parts of the mixer to prevent the materials being mixed from setting on the interior of the apparatus, and to carry out other aims and accomplish other objects such as will be apparent upon a careful consideration of the accompanying drawings, taken together with the following matter descriptive thereof.

Figure 1:
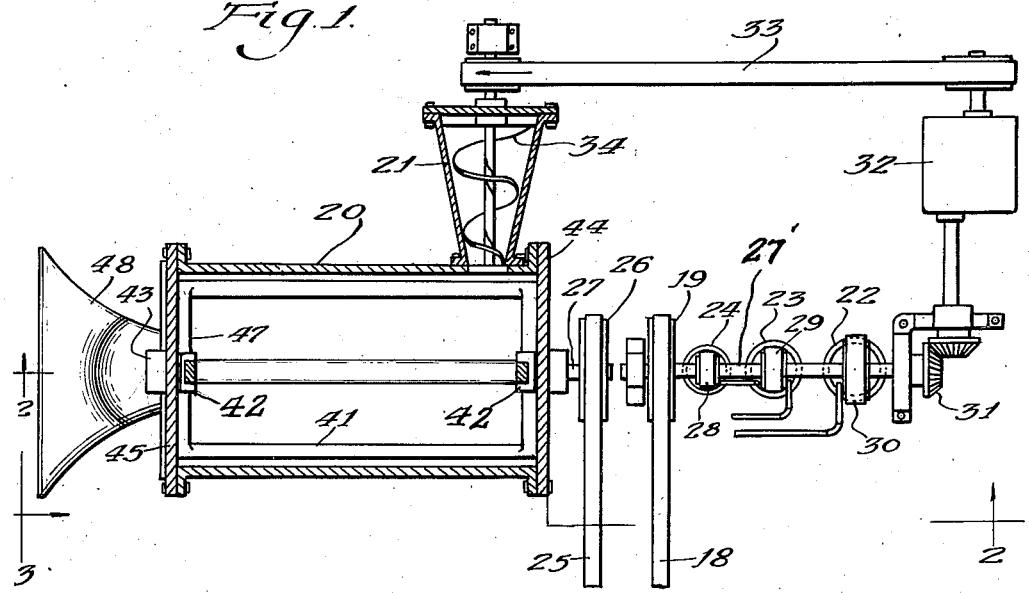
Figure 1 is a plan view of the mixing apparatus hereof with part in section taken on line 1—1 of Figure 2.
Figure 2:
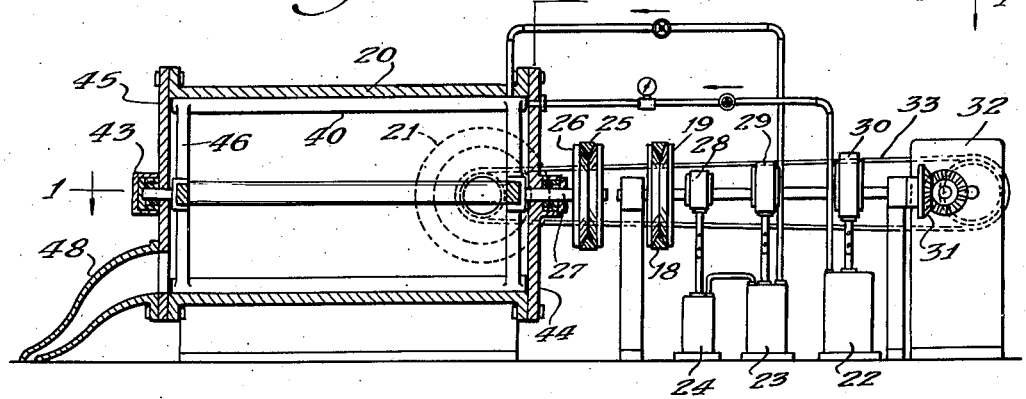
Figure 2 is a side elevation of the mixing apparatus with a part thereof shown in section taken on line 2—2 of Figure 1.
Figure 3:
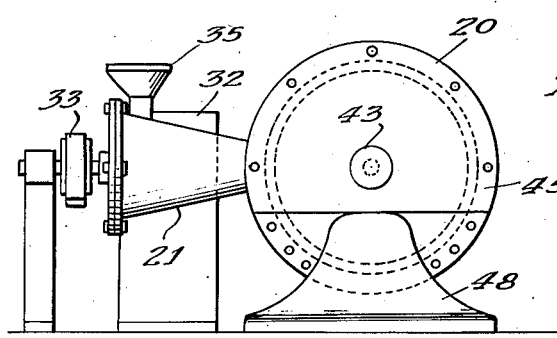
Figure 3 is a front end elevation of the apparatus with some detail of piping and the like omitted.

The stucco or gypsum mixing apparatus hereof is designed for continuous mixing, that is, the mixer is designed for its particular use, for the particular capacity or output desired per unit time and, of course, in every different application the preferred mixer will be of a different size. The mixer is so designed that at all times it is full of the ingredients being mixed, and these are continuously fed to the mixer in the required proportions, and the mixed materials are discharged therefrom at a rate which is determined by the amount of mixing required to obtain the proper admixture of the various ingredients. For any particular mixer, its size may be determined from the figures representing the required output and the length of time during which any unit of the material being mixed is required to be mixed in order to obtain the proper admixture. Knowing the output which is required for the mixer and the time required for the admixture of any unit of the materials being mixed, then the size of the mixer required can be determined.

The entire mixing device comprises a mixer which is designated by the numeral 20, a dry material feeder designated by the numeral 21, an air feeder 22, a water feeder 23, and a chemical feeder 24. The various feeders designated by numerals 21 to 24, inclusive, are proportioning feeders which are so designed that the rates at which the various ingredients are fed to the mixer 20 are such that all the ingredients to be admixed are fed continuously in the required and desired proportions, each with respect to the other.

As shown in the drawing, suitable drives are provided for driving, on the one hand, the mixer, and on the other hand the various proportioning feeders for feeding the gypsum, air, water and chemical feeders. The parts of the apparatus are driven by belts 18 and 25 driving, respectively, pulleys 19 and 26 which are represented as Reeves' variable speed pulley drives, whereby the speed at which each, the mixer and the feeders, may be independently varied, one with respect to the other. The drives which are illustrated, it will, of course, be understood, are merely representative of variable speed driving devices for the two parts of the apparatus, that is, the mixer and the feeding devices, and as will be well understood by one skilled in the art, any means providing for varying the speeds of these respective parts of the apparatus may be substituted, as, for example, the entire apparatus may be driven from a variable speed motor with some form of speed varying device interposed between such drive and either of the elements of the apparatus, and which arrangement will provide for independent variation of the speeds of operation of the mixer and of the feeding apparatus.

The variable speed pulleys 26 and 19 are mounted respectively on shafts 27 and 27', 27 being the drive shaft for the mixer and 27' being the drive shaft for the feeding devices. On shaft 27' there are mounted variable eccentrics 28, 29 and 30, which operate the pumps which comprise the chemical, water and air feeders 24, 23 and 22, respectively, these feeders 22, 23 and 24 being illustrated as variable stroke pumps for measuring and feeding the respective ingredients in accordance with the requirements therefor in the mixture. The capacity of the various pumps may from time to time be varied as is desired, by appropriate adjustments of the respective variable driving eccentrics.

On the remote end of shaft 27', that is, the end remote from pulley 19, there is shown a bevel gear 31 which serves as a drive for a variable speed mechanism generally indicated at 32 which serves, by means of belt 33, to drive the feeder element 34 of dry feeder 21.

With the foregoing arrangement of the apparatus, it will be understood that the speed of the mixer may be suitably adjusted to obtain the desired mixing of the materials being mixed therein and that, independently, by suitable adjustment of the various variable drive means provided, the speed of the feeders may be adjusted to pass the required amount of materials to the mixer and to force the same therethrough, and that the proportions of the various materials being fed may be adjusted so that not only is the desired amount of materials fed to the mixer, but such is fed to the mixer in the desired proportions.

It is to be understood that the specific disclosure of the various feeders and the drive therefor is merely for the purpose of illustration, and that any other suitable mechanism for accomplishing the same results may be substituted therefor, since it is obvious that the specific form of such portions of the apparatus is immaterial in that the essential is that there be provided means for definitely and proportionately feeding the various ingredients to be mixed. In the operation of the various feeding elements which have been described, it is believed to be readily apparent that the dry ingredients, calcined gypsum, preferably with pre-mixed proportions of fiber and retarder or accelerator, as may be required, may be fed to hopper 35 of dry feeder 21, whereupon, as the feeder element 34 is operated, the dry ingredients will be fed to the mixer in predetermined quantities. A suitable surface tension reducing agent will be fed to the intake of chemical feeder 24, water will be fed to the intake of water feeder 23, and air will be fed to the intake of air feeder 22, and as the pistons of these respective feeder pumps are reciprocated by their respective eccentrics 28, 29 and 30, these various ingredients will be fed in measured proportions to the mixer 20. It will be understood, of course, that the feeders 22, 23 and 24, as shown, are conventional pumps, and that the details thereof have not been shown since such is not necessary for an understanding of the invention. Anyone having any skill whatsoever in the art involved will understand the operations of such a feeder, and details have not been shown since they would merely tend to confuse the disclosure rather than aid in an understanding of the inventions disclosed.

All these various feeders, feeding the required ingredients to mixer 20 being driven from a single source, and providing for variation as by suitable adjustment of eccentrics 28, 29 and 30 and by suitable variation of the variable speed unit 22, it is apparent that the proportions of the various ingredients may be varied as desired in order that the desired proportions may be delivered to the mixer 20 for admixture therein.

Mixer 20 is provided interiorly with mixing elements 40 and 41, of which the mixer elements 40 comprise both mixing and scraping elements. These mixer elements 40 and 41 extend lengthwise of the mixer and are mounted on arms which will be designated, generally, as spiders 42, which spiders are at one end mounted on an end of drive shaft 27, and at the other end of the mixer mounted on a stub shaft 43, and in connection with which shafts it is understood, of course, that suitable journals or bearings therefor are provided in the respective end plates 44 and 45 of mixer 20.

In connection with mixer elements 40 and 41, it is to be noted that mixer elements 40 are so formed and supported on the spiders 42 that the forward edges of these mixer elements scrape the interior periphery of the mixer shell, and that arms 47 of spider 42, that is the arms which support the mixer elements 41, are so formed and positioned that these arms 47 scrape the interior surfaces of the end plates 44 and 45 of the mixer. It will be seen that with the mixer elements 40 scraping the interior periphery of the mixing shell, and spider arms 47 scraping the end plates, that the entire interior surface of the mixer is continuously swept by scraping elements which continuously sweep from these surfaces any of the gypsum mixture which might tend to set thereon.

At the forward end of the mixer, in end plate 45, there is provided a suitable discharge spout 48 from which the gypsum stucco or slurry is discharged from the mixer after it has been suitably admixed. The specific design of this discharge nozzle 48 is of no particular moment except that it will be understood, of course, that it should be so shaped that the passage therethrough is substantially uniform in cross sectional area so that a uniform flow of the discharged mix of stucco will be maintained through the nozzle, and there will be no opportunity for the gypsum slurry to set on the interior surfaces of the nozzle since it is, what might be termed, self-cleaning, inasmuch as a constant and uniform flow is maintained throughout the entire mixing apparatus due to the fact that the ingredients are continuously and uniformly forced into the mixer by the various feeder apparatus which have been described.

It will be seen that in the foregoing there has been described a mixer which is designed to receive the various ingredients to be mixed at a constant rate which, however, is variable and in controlled proportions so that the ingredients of the mixture are under constant control and that further, whereas, provision is made for sweeping or scraping the interior surfaces of the mixer the interior surface of the mixer is further kept clear of the materials being admixed due to the fact that the design of the mixer and its auxiliary apparatus is such that a constant and uniform flow of materials is maintained through the mixer, so that there is no opportunity for the materials being admixed to lodge on the interior surfaces and settling there to interfere with the proper admixture of the ingredients which are being mixed.

What I claim is:

1. Apparatus for feeding and mixing a setting cementitious slurry and comprising in combination a mixer, feeding devices therefor and closed conduits connecting the feeders to the mixer; the mixer comprising a closed casing, inlets and outlet in said casing and a mixing device operatively mounted therein; the feeders comprising independent force feed measuring devices feeding the various ingredients, means associated with each feeder independently varying the capacity thereof, means driving the mixing device in the mixer and means driving the feeders as a group but at a speed which is variable relative to the speed of operation of the drive of the mixing device.

2. In combination in an apparatus for the preparation of a cementitious slurry, a mixer receiving and mixing the ingredients comprising the slurry, a group of feeding means feeding to the mixer the ingredients to be mixed, the feeding means comprising a dry material feeder feeding dry cementitious material and separate variable capacity feeders for feeding water, air and each other ingredient to be admixed, a single drive means operating the said group of feeding means whereby the rate of operation of each of the feeding means is fundamentally the same, a speed varying device interposed in the cementitious material feeder drive, means varying the capacity of each variable capacity feeding means independently of the variation of capacity of each other feeding means, means driving the mixer, means operating the group of feeding means, and means for varying the speed of operation of the mixer relative to the speed of operation of the single means operating the group of feeders.

CARL G. MUENCH.

REFERENCES CITED

The following references are of record in the file of this patent:

UNITED STATES PATENTS

| Number | Name | Date |
|---|---|---|
| 750,949 | Darrow et al. | Feb. 2, 1904 |
| 1,010,046 | Hedges | Nov. 28, 1911 |
| 1,372,172 | Larsen | Mar. 22, 1921 |
| 1,408,473 | Royan | Mar. 7, 1922 |
| 1,497,957 | Streich | June 17, 1924 |
| 1,670,677 | Brown | May 22, 1928 |
| 1,751,953 | Spengler | Mar. 25, 1930 |
| 1,941,808 | McConnaughay | Jan. 2, 1934 |
| 1,945,306 | Dean | Jan. 30, 1934 |
| 1,995,540 | Harrison | Mar. 26, 1935 |
| 2,069,078 | Rice et al. | Jan. 6, 1937 |
| 2,125,046 | Crandell | July 26, 1938 |
| 2,309,306 | Fischer | Jan. 26, 1943 |
| 2,352,553 | Lefebure | June 27, 1944 |